Figure 1:
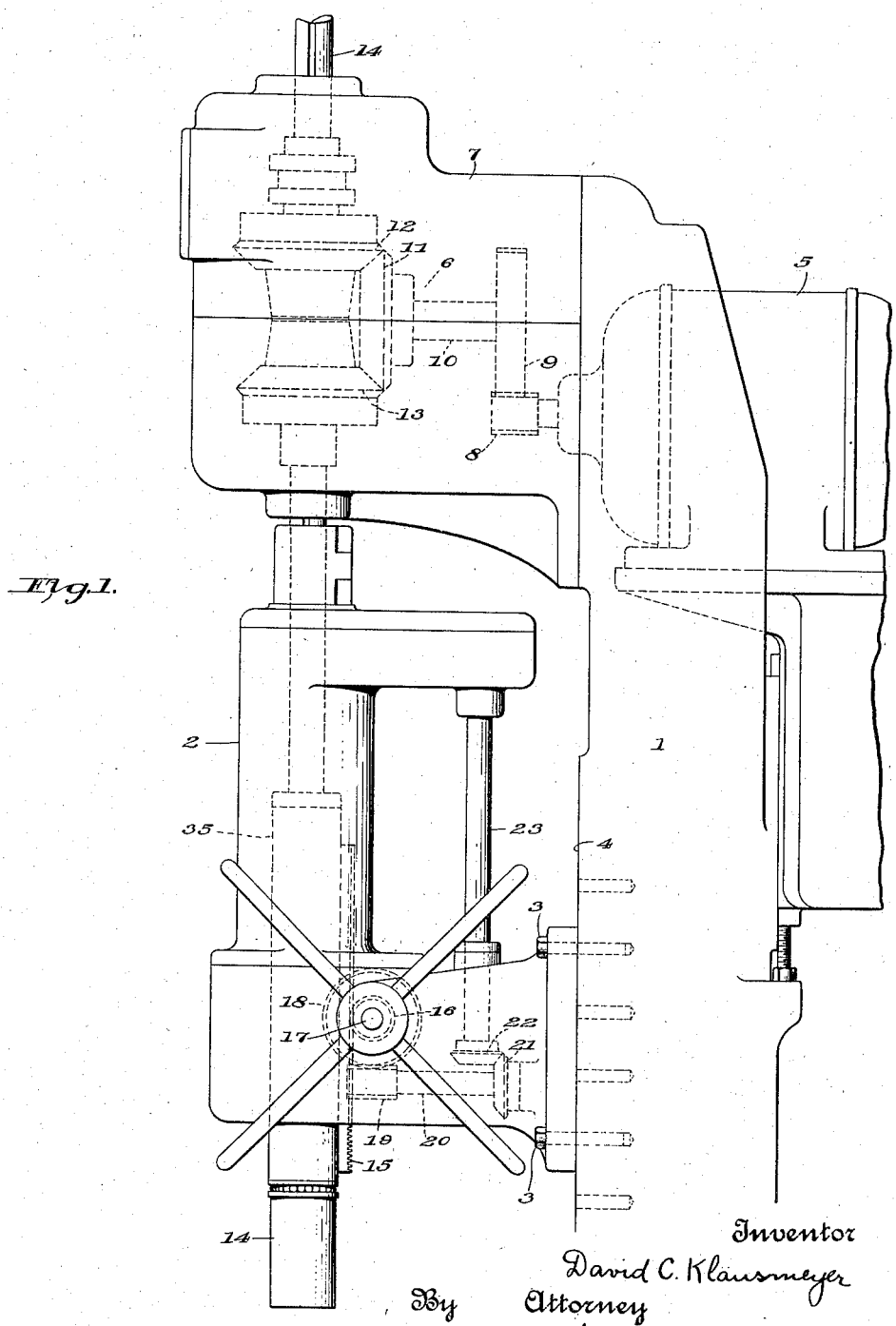

Jan. 14, 1930.　　　D. C. KLAUSMEYER　　　1,744,000
HEAD CARRIED GEAR TRAIN FOR SPINDLE FEED
Filed March 31, 1925　　3 Sheets-Sheet 2

Inventor
David C. Klausmeyer
By Attorney
Albert F. Nathan

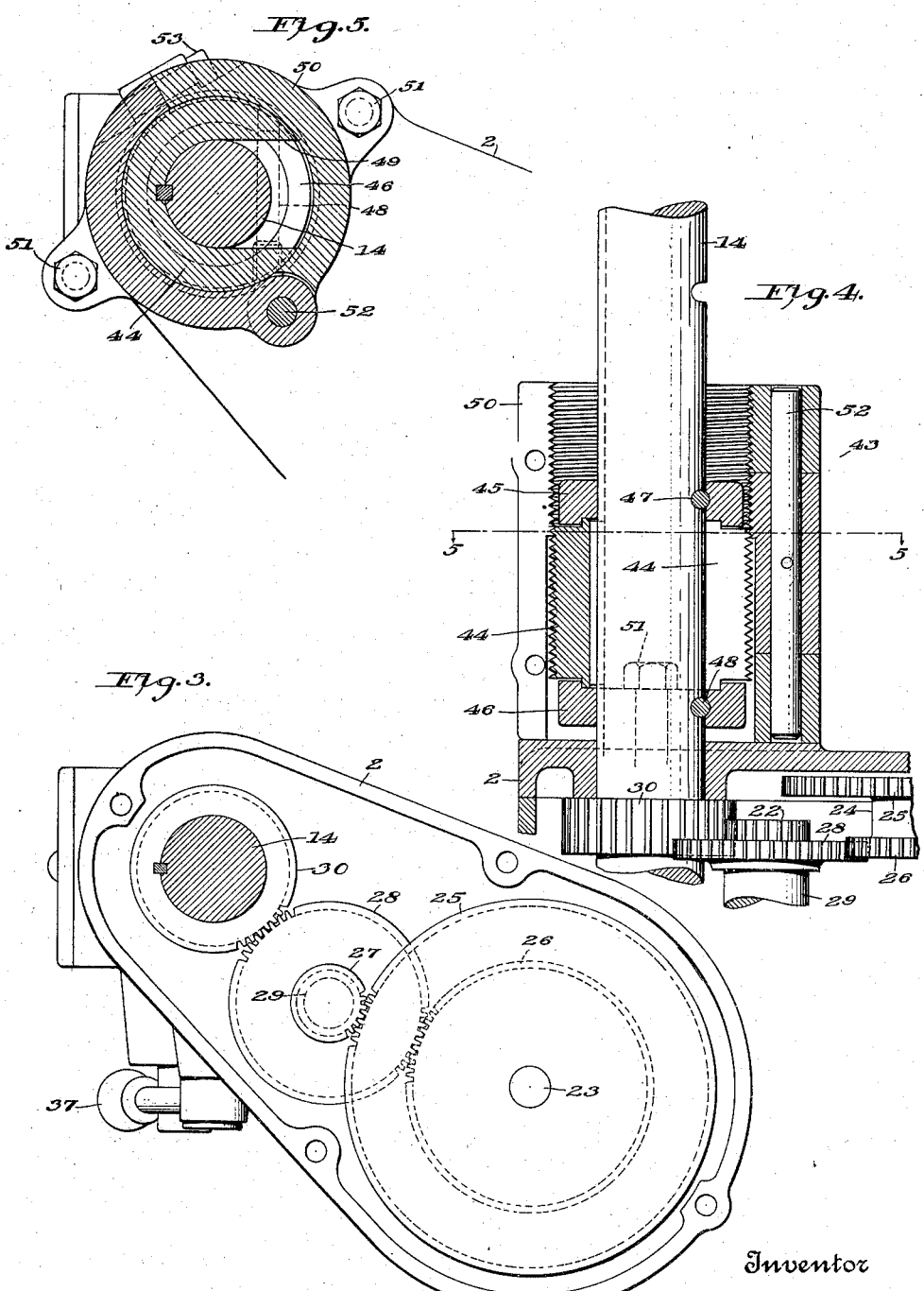

Patented Jan. 14, 1930

1,744,000

UNITED STATES PATENT OFFICE

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO

HEAD-CARRIED GEAR TRAIN FOR SPINDLE FEED

Application filed March 31, 1925. Serial No. 19,665.

My invention is concerned with the feeding mechanism for a drilling machine and is chiefly concerned with mechanism for effecting the feeding of the drill spindle on the head of an upright drilling machine.

In an upright drilling machine, a column, which constitutes a part of the main frame of the machine, carries a drill head which is movable in a vertical direction. The drill head carries a translatory sleeve which supports a drill carrying spindle. The spindle, which has the upper end thereof formed as a splined shaft, is connected to a set of gearing supported by the yoke at the top of the column. The gearing carried at the top of the column is connected to a suitable source of power such as for example as an electric motor. During a drilling operation and also during a tapping operation it is necessary to effect translatory or feeding movement of the spindle carrying sleeve. The feeding movement of the sleeve is effected, in machines now in common use, by power supplied directly from the gearing carried on top of the column. The feeding mechanism for the sleeve on the head is generally connected to the gearing on the top of the column by means of a splined shaft located parallel to the drill carrying spindle. Thus it has been necessary heretofore to provide a splined connection between the gearing on top of the column and the feed mechanism on the head in order to prevent interference with the vertical movement of the head.

In an upright drilling machine constructed in accordance with my invention, the mechanism for effecting translatory movement of the spindle carrying sleeve is operated by the drill spindle and is not connected to the gearing at the top of the column in the manner of the machines heretofore constructed. The feed mechanism on the head is supplied with power from the rotating spindle in order to simplify the gearing mechanism. Thus, it is possible to do away with the splined shaft connection which is usually provided for connecting the feeding mechanism to the gearing located on top of the column. Moreover, such a construction permits the installing of a much simplified variable feed mechanism on the drill head. Suitable change gears are directly mounted on the drill head for varying the feeding movement of the spindle carrying sleeve.

My invention not only provides for mounting the feeding mechanism on the drill head but also provides for mounting directly on the top of the drill head the mechanism which is utilized for effecting feeding movements of the spindle carrying sleeve during a tapping operation by the machine. No matter whether a drill or tapping operation is being effected by the machine the mechanism for effecting the feeding is directly connected to the drill carrying spindle and is wholly carried by the drill head.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
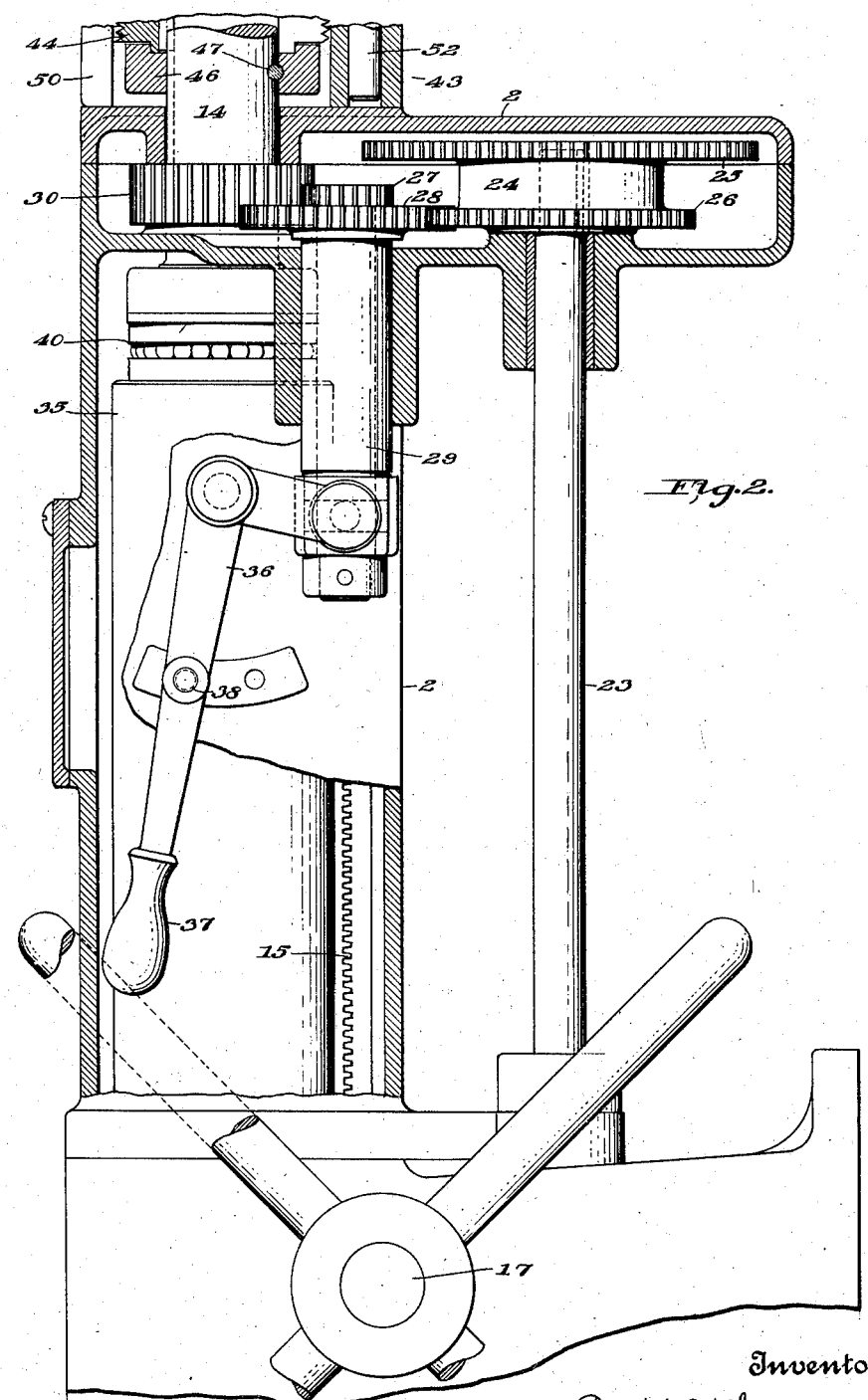

Figure 1 is an elevational view of an upright drilling machine constructed in accordance with my invention. Fig. 2 is a sectional view of the drill head shown in Fig. 1. Fig. 3 is a plan view of the drill head shown in Fig. 2 of the drawings. Fig. 4 is a sectional view of the lead mechanism mounted on top of the drill head. Fig. 5 is a sectional view along the line 5—5 of Fig. 4.

Referring to the drawings, an upright drill is shown comprising a column or main frame 1 which is mounted on a suitable base (not shown). A drill head 2 is adjustably mounted on the column 1 and is preferably secured thereto by means of bolts 3, as shown in Fig. 1 of the drawings. The head 2 is fitted to a surface 4 formed on the column 1 and may be secured in various set positions according to the tapped holes formed in the column. If so desired the head 2 may be operated along suitable guideways of conventional form on the column 1 and be clamped at any point in accordance with the usual practice. Inasmuch as my invention is not particularly concerned with the means for supporting the head on the frame a further description thereof is deemed unnecessary.

A main motor 5, which is mounted on the top of the column, is connected to suitable gearing 6 carried on the bracket or yoke 7. The bracket 7 extends from the top of the column 1, as shown in Fig. 1 of the drawings. A pinion 8, which is mounted on the end of the motor shaft, is shown meshing with a gear wheel 9 mounted on a shaft 10. The shaft 10 carries a bevel gear wheel 11 which meshes with two bevel gear wheels 12 and 13 rotatably mounted on the drill carrying spindle 14 of the machine. The bevel gears 12 and 13 are selectively connected to the spindle 14 in any conventional manner in order to selectively operate the spindle in a forward and in a reverse direction. Inasmuch as my invention is not particularly concerned with the specific connection between the gearing carried at the top of the column and the drill carrying spindle, it is deemed unnecessary to further describe such mechanism.

The drill carrying spindle 14 is supported on the head 2 by means of a sleeve member 35. The sleeve member 35 carries a rack 15 which is engaged by a pinion 16 on a shaft 17. The shaft 17 also carries a worm wheel 18 which meshes with a worm member 19 on a shaft 20. The shaft 20 carries a bevel gear wheel 21 which meshes with a bevel gear wheel 22 on a shaft 23. The shaft 23, near the upper end thereof, carries a member 24 which has two sets of gear teeth 25 and 26 formed thereon, as shown in Fig. 2. The teeth 25 and 26 on the member 24 are adapted to mesh with gear wheels 27 and 28 which are mounted on a shiftable shaft 29. The gear wheels 27 and 28 are fixedly connected together in any suitable manner and the gear wheel 28 is maintained in mesh with a gear wheel 30 which is splined to the spindle 14. When the gear wheel 30 on the spindle 14 is connected through the gear wheel 28 to the teeth 26 on the member 24, the feeding of the sleeve member 35 is effected at a relatively rapid rate and when the gear wheel 27 is connected to the teeth 25 on the member 24, the sleeve member is fed at a somewhat slower rate. The teeth 26 and the teeth 25 are separated from each other a sufficient distance, as shown in Fig. 2 of the drawings, in order to permit the gear wheels 27 and 28 to have a position therebetween for stopping the feeding movement of the sleeve. The rod 29, which carries the gear wheels 27 and 28, is shifted by means of a bell crank lever 36. The bell crank lever 36 is operated by means of a handle 37 and is provided with a suitable pin 38 for accentuating the operative positions thereof. In the above construction it will be noted the gearing connection between the gear wheel 30 on the spindle 14 and the rack 15 on the sleeve 35 is entirely carried by the drill head 2. No additional spline shaft is needed for supplying power to effect a feeding movement as in many of the upright drills heretofore constructed.

A roller bearing 40 is preferably provided between the top of the sleeve member 35 and a shoulder on the spindle 14 as best shown in Fig. 2 of the drawings. The feed mechanism already described is used during a drilling operation. In case it is desired to utilize the machine for effecting a tapping operation, it is preferable to use the lead mechanism 43 mounted on top of the head 2 for effecting a feeding movement of the drill carrying spindle 14. The lead mechanism 43 is best shown in Figs. 4 and 5 of the drawings and comprises a block member 44 which is splined to the spindle 14 and which is held in position on the spindle by means of two collar members 45 and 46. The two collar members 45 and 46 are prevented from having longitudinal movement along the spindle by means of two pins 47 and 48 as shown in Figs. 4 and 5 of the drawings. A portion of the block 44 is cut away at 49, as shown in Fig. 5 of the drawings, in order to permit a quick removal of the block from engagement with the spindle. The block 44 is threadably connected to a casing 50 which is secured to the top of the drill head 2 by means of bolts 51. Such casing 50 is formed in two parts which are pivotally connected together by means of a pin 52. The two portions of the casing 50 are held together by means of bolts 53, as shown in Fig. 5 of the drawings. The casing 50 and the nut or block 44 are connected together by means of a suitable thread which has the same pitch as the threads to be formed in the hole being tapped. If different threads are to be formed in the hole being tapped it is necessary to replace the casing 50 and the block 44 by another casing and block which are connected together by the thread having the desired pitch.

In the above described mechanism it will be noted that the feeding mechanism utilized during the drilling operation or the feeding mechanism utilized during the tapping operation are carried wholly by the drill head. Consequently the drill head may be provided with only one splined shaft connection with the main source of power. It is also apparent the feeding mechanism utilized during the drilling operation is very much simplified as compared with feeding mechanism which are directly connected to the gearing mounted on top of the column. Attention is further called to the fact that the change gears for varying the feeding operation are carried on the drill head.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In an upright drilling machine, the combination comprising a main frame; a drill head vertically adjustable on said frame but fixed thereto during a drilling operation; a sleeve for supporting a drill-carrying spindle on said head said sleeve being translatably supported in said head; a rack mounted on said sleeve; and a feed mechanism for the spindle mounted on said head comprising a pinion engaging said rack, a gear splined upon said spindle at a point above the sleeve and journaled in a portion of the head in fixed relation with the pinion, and a power train connecting said gear with said pinion.

2. In an upright drilling machine, the combination comprising a main frame; a drill head secured to said frame; a drill-carrying spindle; a sleeve for slidably supporting said spindle on the head and having a rack mounted thereon; a feed pinion carried by said head and meshing with said rack; gearing mounted on said main frame and connected to a source of power, said gearing having a splined connection with said drill-carrying spindle; and gearing wholly mounted on said head in fixed relation with said pinion for connecting the spindle to said pinion to effect feeding movement by the drill spindle.

3. In an upright drilling machine, the combination comprising a main frame; a drill head secured to said frame; propelling gearing mounted on said main frame; a drill-carrying spindle mounted on said head and having a splined connection with said propelling gearing; a rack movable axially with said spindle; a pinion supported by said head and maintained in mesh with said rack; a feed driving gear having a splined connection with said spindle; and means comprising spindle feed gearing receiving motion from feed driving gear and connected with said pinion for rotating said pinion to effect feeding movement of said spindle during rotation thereof, said feed drive gear and said spindle feed gearing being supported wholly by said head and having a fixed relation with said pinion.

4. An upright drilling machine combining a main frame; a head secured to said frame and formed at its upper end with a gear box; a sleeve translatably but non-rotatably mounted in said head; a spindle rotatably but non-translatably journaled in said sleeve; means supported by said main frame to rotate said spindle; a rack carried by said sleeve; a pinion rotatably journaled in said head and meshing with said rack to effect translation of said sleeve and spindle; a feed driving gear located within said gear-box and splined to said spindle; a plurality of driven gears of different diameters rotatably mounted in said gear box; a non-extensible operative connection between said driven gears and said pinion; and means for selectively connecting said driven gears with said driving gear to effect translation of the spindle at different rates.

5. An upright drilling machine combining a main frame; a head secured to said frame and formed at its upper end with a gear box; a sleeve translatably but non-rotatably mounted in said head; a spindle rotatably but non-translatably journaled in said sleeve; means supported by said main frame to rotate said spindle; a rack carried by said sleeve; a pinion rotatably journaled in said head and meshing with said rack to effect translation of said sleeve and spindle; a feed-driving gear splined to said spindle; a plurality of driven gears of different diameters rotatably mounted in said gear box; an operative connection between said driven gears and said pinion; a plurality of intermediate gears rotated by said driving gear; and means selectively to mesh said intermediate gears with said driven gears to effect translation of the spindle at different rates.

6. An upright drilling machine combining a main frame; a head secured to said frame; a sleeve translatably but non-rotatably mounted in said head; a tool spindle rotatably journaled in said sleeve and held against axial movement relative thereto; means supported by said main frame to rotate said spindle; a member rotatably journaled in said head and having an operative connection with said sleeve, whereby rotation of said member effects translation of said sleeve and spindle; a relatively wide driving gear splined to said spindle; a first driven gear permanently in mesh with said driving gear and adapted to be shifted axially; a second driven gear arranged with its axis in line with the axis of said driven gear and held to rotate synchronously therewith; two gears of unequal size supported by said head; an operative connection between the last named gears and the rotatable member which effects translation of the sleeve; and means selectively to shift said driven gears into mesh with the last named gears while maintaining the first of said driven gears in mesh with the gear on the spindle.

In witness whereof, I have hereunto subscribed my name.

DAVID C. KLAUSMEYER.